United States Patent
Ferguson et al.

(10) Patent No.: US 9,232,536 B2
(45) Date of Patent: Jan. 5, 2016

(54) MAINTENANCE OF CHANNEL USAGE IN A WIRELESS COMMUNICATION SYSTEM

(71) Applicant: Intel Corporation, Santa Clara, CA (US)

(72) Inventors: Charles T. Ferguson, Satellite Beach, FL (US); Thomas Gorsuch, Merritt Island, FL (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/559,655

(22) Filed: Dec. 3, 2014

(65) Prior Publication Data
US 2015/0085832 A1   Mar. 26, 2015

Related U.S. Application Data

(63) Continuation of application No. 13/211,853, filed on Aug. 17, 2011, now Pat. No. 8,908,652, which is a continuation of application No. 11/235,389, filed on Sep. 26, 2005, now Pat. No. 8,045,990, which is a continuation of application No. 09/288,229, filed on Apr. 8, 1999, now Pat. No. 6,965,778.

(51) Int. Cl.
| | |
|---|---|
| H04B 7/216 | (2006.01) |
| H04W 72/14 | (2009.01) |
| H04W 72/04 | (2009.01) |
| H04W 84/08 | (2009.01) |
| H04J 13/00 | (2011.01) |
| H04W 76/06 | (2009.01) |

(52) U.S. Cl.
CPC ............... *H04W 72/14* (2013.01); *H04J 13/00* (2013.01); *H04W 72/0413* (2013.01); *H04W 84/08* (2013.01); *H04W 76/06* (2013.01)

(58) Field of Classification Search
USPC .................................. 370/328, 335, 342, 479
See application file for complete search history.

(56) References Cited

U.S. PATENT DOCUMENTS

| | | | |
|---|---|---|---|
| 4,107,469 | A | 8/1978 | Jenkins |
| 4,577,316 | A | 3/1986 | Schiff |
| 4,625,308 | A | 11/1986 | Kim et al. |
| 4,675,863 | A | 6/1987 | Paneth et al. |
| 4,862,453 | A | 8/1989 | West et al. |

(Continued)

FOREIGN PATENT DOCUMENTS

| | | |
|---|---|---|
| EP | 0 433 061 | 8/1991 |
| EP | 0 629 064 | 12/1994 |

(Continued)

OTHER PUBLICATIONS

Heine, "The Air-Interface of GSM," GSM Networks: Protocols, Terminology, and Implementation, (MA: Artech House, Inc.), pp. 89-100 (1999).

(Continued)

*Primary Examiner* — Alvin Zhu
(74) *Attorney, Agent, or Firm* — Blakely, Sokoloff, Taylor & Zafman LLP

(57) ABSTRACT

Data is accessed from a network via a wireless communication link. A determination is made as to whether payload data has been received from a subscriber's terminal. If so, then a request is sent for a first set of traffic channels, and the payload data is transmitted over the first set of traffic channels.

16 Claims, 3 Drawing Sheets

(56) References Cited

U.S. PATENT DOCUMENTS

| | | |
|---|---|---|
| 4,866,709 A | 9/1989 | West et al. |
| 5,027,348 A | 6/1991 | Curry, Jr. |
| 5,103,459 A | 4/1992 | Gilhousen et al. |
| 5,115,309 A | 5/1992 | Hang |
| 5,282,222 A | 1/1994 | Fattouche et al. |
| 5,325,419 A | 6/1994 | Connolly et al. |
| 5,412,429 A | 5/1995 | Glover |
| 5,442,625 A | 8/1995 | Gitlin et al. |
| 5,446,727 A | 8/1995 | Bruckert et al. |
| 5,490,136 A | 2/1996 | Sereno |
| 5,585,850 A | 12/1996 | Schwaller |
| 5,586,119 A | 12/1996 | Scribano et al. |
| 5,592,470 A | 1/1997 | Rudrapatna et al. |
| 5,617,423 A | 4/1997 | Li et al. |
| 5,619,491 A | 4/1997 | Panzer |
| 5,619,492 A | 4/1997 | Press et al. |
| 5,655,001 A | 8/1997 | Cline et al. |
| 5,657,358 A | 8/1997 | Panech et al. |
| 5,663,958 A | 9/1997 | Ward |
| 5,687,194 A | 11/1997 | Paneth et al. |
| 5,689,502 A | 11/1997 | Scott |
| 5,697,059 A | 12/1997 | Carney |
| 5,699,364 A | 12/1997 | Sato et al. |
| 5,703,881 A | 12/1997 | Kay et al. |
| 5,734,646 A | 3/1998 | I et al. |
| 5,742,592 A | 4/1998 | Scholefield et al. |
| 5,745,484 A | 4/1998 | Scott |
| 5,754,555 A | 5/1998 | Hurme et al. |
| 5,758,288 A | 5/1998 | Dunn et al. |
| 5,781,542 A | 7/1998 | Tanaka et al. |
| 5,790,549 A | 8/1998 | Dent |
| 5,802,046 A | 9/1998 | Scott |
| 5,828,662 A | 10/1998 | Jalali et al. |
| 5,831,978 A | 11/1998 | Willars et al. |
| 5,959,980 A | 9/1999 | Scott |
| 5,987,019 A | 11/1999 | Raith et al. |
| 5,987,326 A | 11/1999 | Tiedmemann, Jr. et al. |
| 6,005,852 A * | 12/1999 | Kokko et al. ............ 370/329 |
| 6,028,854 A | 2/2000 | Raith et al. |
| 6,058,338 A | 5/2000 | Agashe et al. |
| 6,081,536 A | 6/2000 | Gorusch et al. |
| 6,094,576 A | 7/2000 | Hakkinen et al. |
| 6,108,324 A | 8/2000 | Brown et al. |
| 6,108,325 A | 8/2000 | Stephanson et al. |
| 6,151,332 A | 11/2000 | Gorusch et al. |
| 6,163,707 A | 12/2000 | Miller |
| 6,208,871 B1 | 3/2001 | Hall et al. |
| 6,219,342 B1 | 4/2001 | Rege |
| 6,222,832 B1 | 4/2001 | Proctor |
| 6,226,527 B1 | 5/2001 | Dalsgaard et al. |
| 6,233,439 B1 | 5/2001 | Jalali |
| 6,240,083 B1 | 5/2001 | Wright et al. |
| 6,243,581 B1 | 6/2001 | Jawanda |
| 6,246,673 B1 | 6/2001 | Tiedmann, Jr. et al. |
| 6,263,013 B1 | 7/2001 | Hendrickson |
| 6,269,075 B1 | 7/2001 | Tran |
| 6,353,412 B1 | 3/2002 | Soliman |
| 6,438,119 B1 | 8/2002 | Kim et al. |
| 6,671,511 B1 | 12/2003 | Forssell et al. |
| 6,717,916 B1 * | 4/2004 | Ahn et al. ............ 370/252 |
| 6,757,520 B2 | 6/2004 | Attar et al. |
| 6,965,778 B1 | 11/2005 | Ferguson et al. |
| 7,145,889 B1 | 12/2006 | Zhang et al. |

FOREIGN PATENT DOCUMENTS

| | | |
|---|---|---|
| EP | 0 635 949 | 1/1995 |
| EP | 0 642 283 | 3/1995 |
| EP | 0 682 423 | 11/1995 |
| EP | 0 719 062 | 6/1996 |
| EP | 0 720 309 | 7/1996 |
| EP | 0 765 096 | 3/1997 |
| EP | 0 526 106 | 2/1998 |
| EP | 0 872 982 | 10/1998 |
| GB | 2 326 524 | 12/1998 |
| GB | 2 326 564 | 12/1998 |
| WO | 96/08934 | 3/1996 |
| WO | 96/37081 | 11/1996 |
| WO | 97/23073 | 6/1997 |
| WO | 97/26726 | 7/1997 |
| WO | 97/46044 | 12/1997 |
| WO | 99/31811 | 6/1999 |
| WO | 99/52306 | 10/1999 |
| WO | 99/63682 | 12/1999 |

OTHER PUBLICATIONS

Melanchuk et al., "CDPD and Emerging Digital Cellular Systems," Digest of Papers of COMPCON, Computer Society Conference 1996, Technologies for the Information Superhighway, pp. 2-8 (Feb. 25, 1996).

Ovesjo, European Telecommunication Standard, SMG2 UMTS Physical Layer Expert Group, "UTRA Physical Layer Descriptions FDD Parts," v0.4, pp. 1-41, (Jun. 25, 1998).

Telecommunications Industry Association, "TIA/EIA Standard: Mobile Station-Base Station Compatibility Standard for Wideband Spread Spectrum Cellular Systems," TIA/EIA-95-B (Mar. 1999).

Office Action for U.S. Appl. No. 13/211,853 mailed Jan. 29, 2014, 5 pages.

Office Action for U.S. Appl. No. 13/211,853 mailed Apr. 23, 2013, 6 pages.

Final Office Action for U.S. Appl. No. 13/211,853 mailed Sep. 30, 2013, 6 pages.

Final Office Action for U.S. Appl. No. 09/288,229 mailed Jan. 26, 2005, 9 pages.

Non-Final Office Action for U.S. Appl. No. 09/288,229 mailed Mar. 15, 2002, 7 pages.

Non-Final Office Action for U.S. Appl. No. 09/288,229 mailed Sep. 3, 2003, 8 pages.

Non-Final Office Action for U.S. Appl. No. 09/288,229 mailed Feb. 25, 2004, 10 pages.

Notice of Allowance for U.S. Appl. No. 09/288,229 mailed Jun. 2, 2005, 7 pages.

Final Office Action for U.S. Appl. No. 11/235,389 mailed Mar. 17, 2008, 8 pages.

Non-Final Office Action for U.S. Appl. No. 11/235,389 mailed Jul. 24, 2007, 7 pages.

Non-Final Office Action for U.S. Appl. No. 11/235,389 mailed Aug. 29, 2008, 10 pages.

Non-Final Office Action for U.S. Appl. No. 11/235,389 mailed Aug. 17, 2009, 6 pages.

Non-Final Office Action for U.S. Appl. No. 11/235,389 mailed Apr. 15, 2010, 7 pages.

Notice of Allowance for U.S. Appl. No. 11/235,389 mailed Feb. 12, 2009, 6 pages.

Notice of Allowance for U.S. Appl. No. 11/235,389 mailed Jun. 4, 2009, 7 pages.

Notice of Allowance for U.S. Appl. No. 11/235,389 mailed Dec. 16, 2010, 6 pages.

Notice of Allowance for U.S. Appl. No. 11/235,389 mailed Apr. 12, 2011, 4 pages.

Notice of Allowance for U.S. Appl. No. 11/235,389 mailed Jul. 14, 2011, 7 pages.

International Search Report for PCT/US2000/008783 mailed Sep. 8, 2000, 3 pages.

International Preliminary Examination Report for PCT/US2000/008783 mailed Jul. 18, 2001, 7 pages.

* cited by examiner

US 9,232,536 B2

MAINTENANCE OF CHANNEL USAGE IN A WIRELESS COMMUNICATION SYSTEM

RELATED APPLICATIONS

This application is a continuation of U.S. patent application Ser. No. 13/211,853 filed Aug. 17, 2011, which is a continuation of U.S. patent application Ser. No. 11/235,389 filed Sep. 26, 2005, which issued as U.S. Pat. No. 8,045,990 on Oct. 25, 2011, which is a continuation of U.S. patent application Ser. No. 09/288,229, filed Apr. 8, 1999, which issued as U.S. Pat. No. 6,965,778 on Nov. 15, 2005, which are incorporated by reference as if fully set forth.

BACKGROUND OF THE INVENTION

The present invention relates to a wireless communication system. In particular, the present invention relates to systems and methods for providing wireless connections between a wireless access device and a network.

Wireless access for computing networks is known in the art. Typically such systems are implemented by a layered wireless communication system. Layered communication systems are characterized by levels of processing that are performed for transmission and reception of a data signal. For example, a "physical layer" typically refers to processing that is performed to package a signal for radio transmission; it may include error coding, data interleaving digital code modulation, and other conventional processing. The physical layer can be contrasted with, for example, a "data layer" that performs processing to format a signal into a format appropriate for delivery for the wireless device to the subscriber terminal.

Prior-art systems are disadvantageous because the wireless access device maintains a channel on a physical layer when the subscriber terminal needs to maintain an active channel, even if there is no payload data being transferred over the physical channel. This system is bandwidth inefficient because data transmissions in computer networks are "bursty," characterized by a short transfer of high-rate data, followed by a relatively long period in which no data are transferred. This inefficiency reduces the number of subscribers that can be working on a system.

Thus a need exists for a system in which a subscriber and a wireless-access device can communicate along a layer of the connection, without activating the physical layer until payload data is intended to be sent.

SUMMARY OF THE INVENTION

To alleviate the problems inherent in the prior art, systems and methods are introduced to provide wireless communication to a network.

In one embodiment of the present invention, a wireless access device determines whether payload data has been received from a subscriber's terminal. If so, a first set of traffic channels is requested, and the payload data is transmitted via the first set of traffic channels. A release message can then be sent, thereby freeing the traffic channels from use.

DETAILED DESCRIPTION OF THE INVENTION

The present invention relates to a wireless communication system. In particular, the present invention relates to network communication in a wireless environment in which an idle mode is maintained until data is ready for transmission, and then an active mode is entered for transmission.

Figure 1:
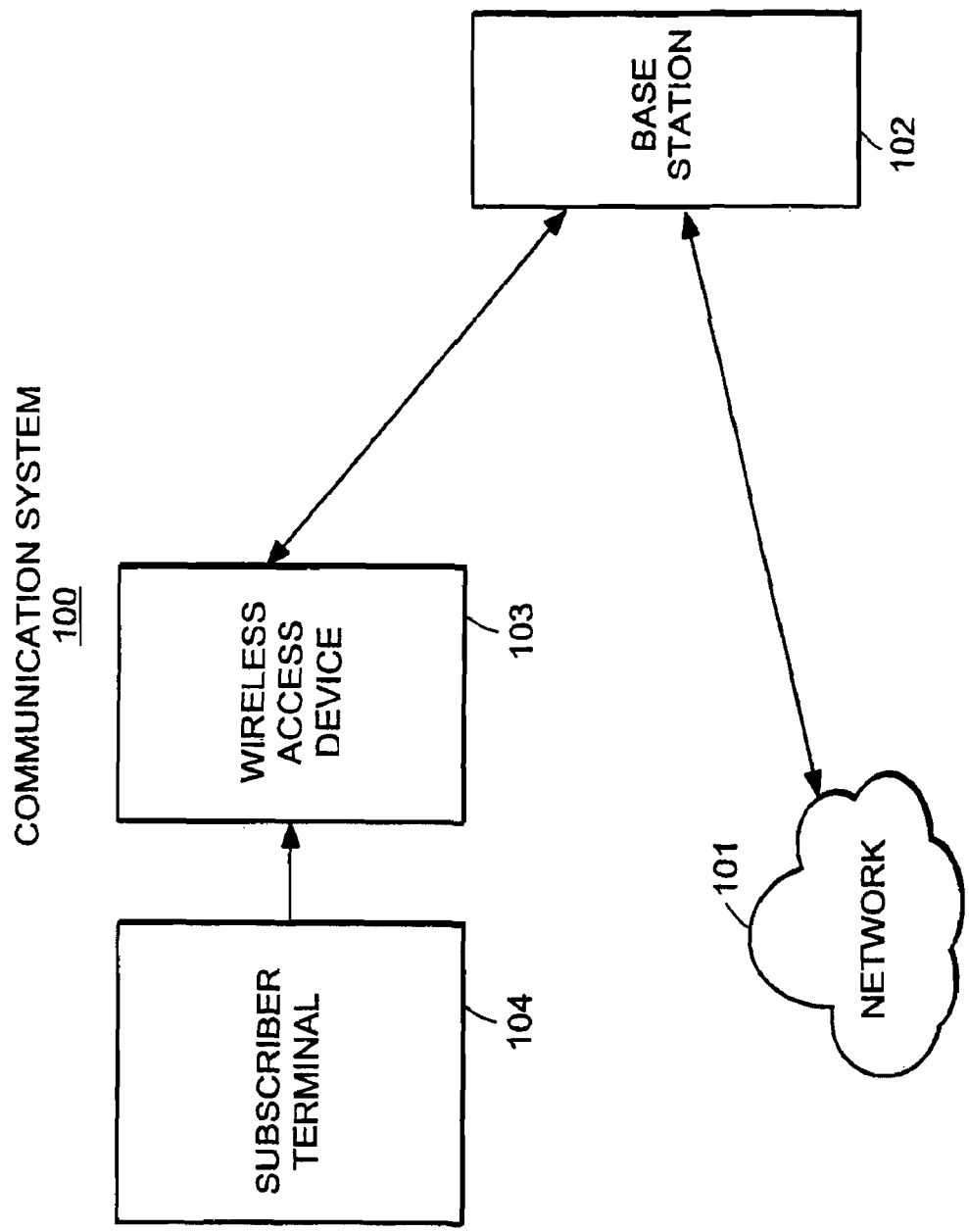
FIG. 1 is a system overview of an embodiment of the present invention including a wireless access device and a base station.

FIG. 1 is a block diagram illustrating a network-communication system constructed in accordance with an embodiment of the present invention. The communication system 100 can include network 101, base station 102, wireless access device 103, and subscriber terminal 104. Wireless access device 103 is typically a wireless, non-roaming device, although the present invention is not limited to non-roaming devices.

Wireless access device 103 can receive payload data from subscriber terminal 104, and transmit both payload and other types of data over communication system 100. Wireless access device can communicate with network 101 through a wireless connection with base station 102. Wireless access device 103 can contain a buffer, or any kind of practicable storage device, to store data received from subscriber terminal 104, and can contain a processor that is capable of determining whether data is present in the buffer, and how much data is in the buffer. The processor can also transmit a request for traffic channels to carry payload data.

Base station 102 can send and receive data to and from both wireless access device 103 and network 101. Base station 102 can receive and process requests for channel assignment, and can assign traffic channels for payload data transmission between base station 102 and wireless access device 103. Base station 102 can also send and receive a release message, thereby deconstructing the assigned traffic channels after the data is sent or received, respectively.

In one embodiment of the present invention, there are at least two distinct network-communication modes. Note that in this context, a mode refers to one direction only, independent of another mode. For example, a device can be idle in the forward direction, but active in the reverse direction.

First is an idle mode, in which no payload data is sent, even though wireless access device 103 has registered with base station 102. In this idle mode, no data is sent. When there is data to be sent, the idle mode becomes an active mode in which traffic channels are assigned, data is transmitted over the traffic channels, and then the traffic channels are released. The network connection has now returned to idle mode. If there is more data to be sent from wireless access device to base station, or from base station to wireless access device, then an active mode is entered in which traffic channels are again assigned and payload data is again transmitted. Once this data is transmitted, the traffic channels are released, and the system again enters an idle mode. Thus, traffic channels are not assigned until some amount of data is present. In one embodiment of the present invention, channels are allocated on a per-subscriber basis. Thus, once traffic channels are requested, all of the allocated traffic channels can be assigned to carry transmitted data. Once this data is transmitted, the traffic channels are released and network awaits the next active mode.

In an embodiment of the present invention, the modes are defined in one direction only. For example, a wireless-access device can be in idle mode for sending information, but can be receiving information at the same time.

In another embodiment of the present invention, a third mode is employed. Specifically, a heartbeat mode is employed such that low-bandwidth timing signals are transmitted over a reverse control or non-traffic channel until payload data is present for transmission. If payload data is present for transmission, then the system enters an active mode as in the previous embodiment. That is, traffic channels are assigned, the payload data is transmitted over the traffic channels, and then the traffic channels are released.

Figure 2:
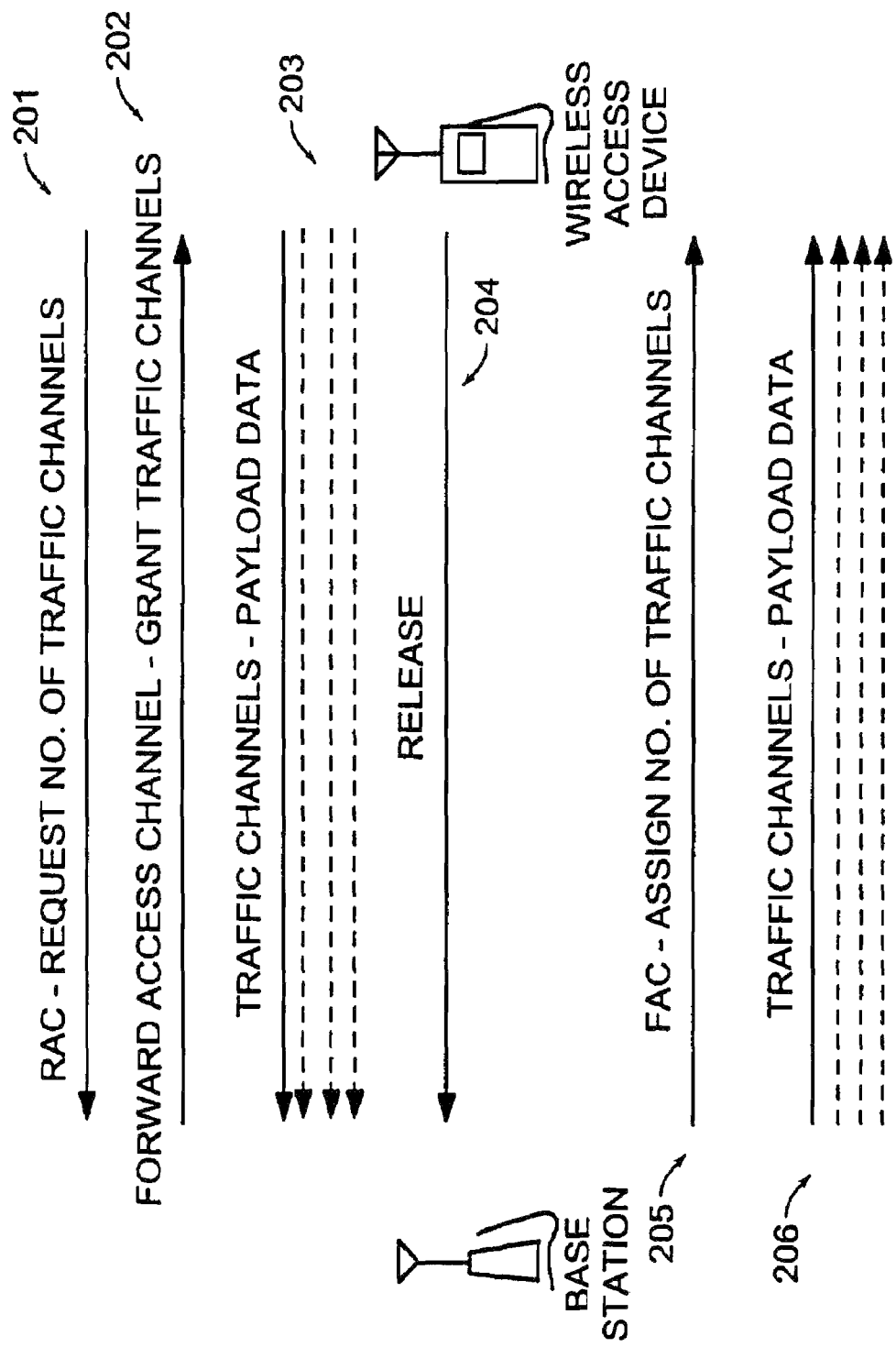
FIG. 2 is a flowchart depicting an embodiment of a method of practicing the present invention from the perspective of a wireless access device.

FIG. 2 is a flow chart of an overview of at least one embodiment of the present invention. In this embodiment, wireless access device 103 has received data from a subscriber terminal, and desires to transmit that data to a network such as the Internet through base station 102. At step 201, wireless access device 103 requests a number of traffic channels from base station 102. This request can be made over a reverse control or non-traffic channel.

At step 202, base station 102 grants the traffic channel request. This can be done by sending wireless access device 103 an explicit message over a forward control or non-traffic channel, thereby creating or constructing the traffic channels. Alternatively, although not shown, base station 102 can simply create or construct the traffic channels based on the request without sending an explicit grant.

Once the traffic channels are constructed, wireless access device 103 can transmit payload data to the base station at step 203, the payload data ultimately intended for a network. Once the payload data is sent, then at step 204, wireless access device 103 can send a release, prompting the base station to release the traffic channels. The system is now in idle mode.

If base station 102 has data to transmit to wireless access device 103, for example, a web page in response to a URL received from the wireless access device, then in one embodiment of the present invention, base station 102 can send a message over a forward control or non-traffic channel to wireless access device 103 that a number of traffic channels has been assigned at step 205. Payload data can be sent over the traffic channels at step 206, and the channels are released at step 207, placing the system back in idle mode.

In another embodiment of the present invention, step 205 does not include a message to wireless access device 104 that a number of traffic channels has been assigned. Rather, in this step, traffic channels are simply assigned, and then payload data is transmitted over the assigned channels at step 206.

As discussed above, the system can include a heartbeat mode in which low-bandwidth timing data is transmitted over an control or non-traffic channel. This heartbeat mode can take the place of the idle mode.

Figures 3, 4:
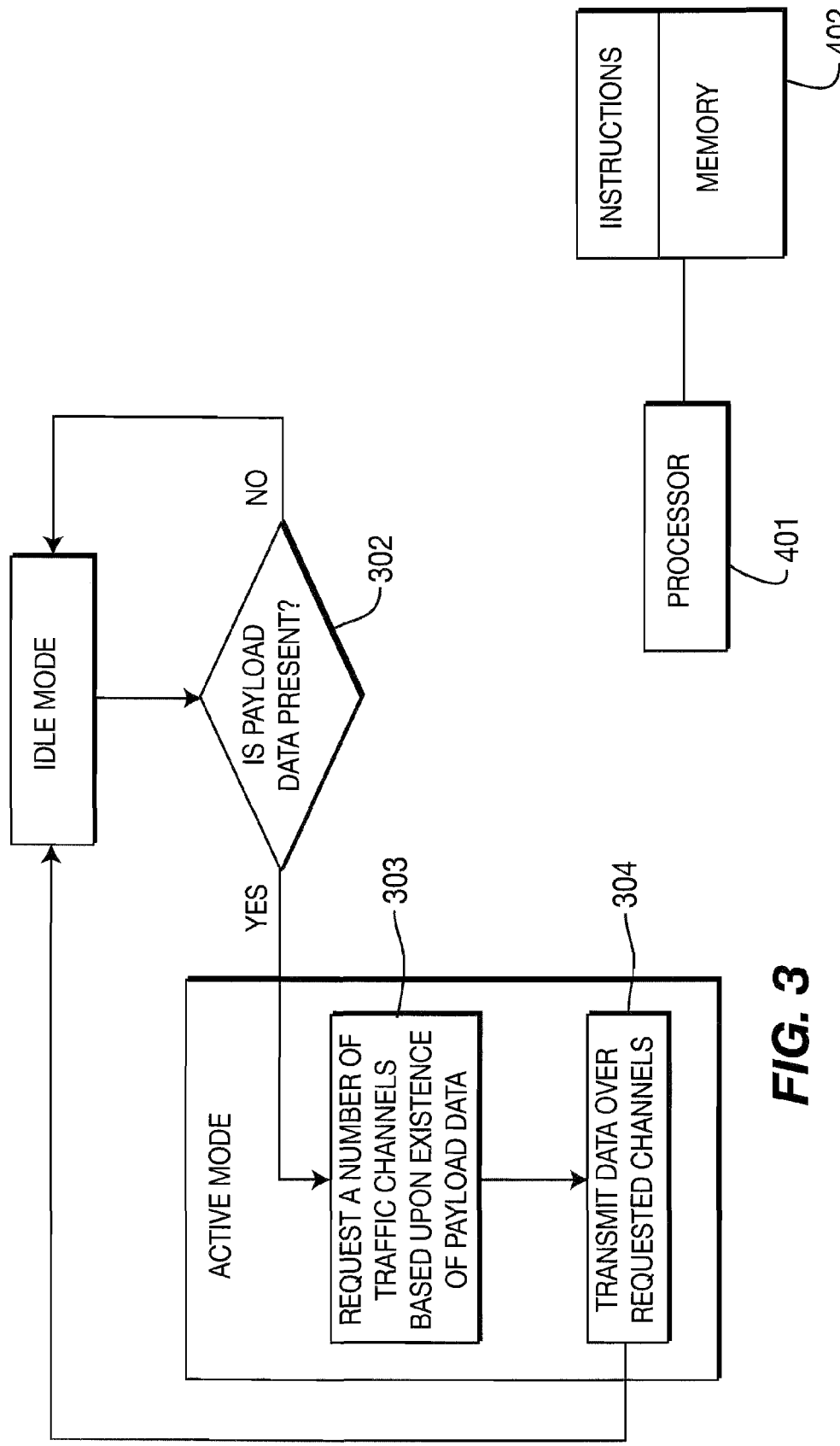
FIG. 3 is a flowchart depicting a method of practicing an another embodiment of the present invention.
FIG. 4 is a block diagram of an apparatus according to an embodiment of the present invention, comprising a processor and a memory.

FIG. 3 is a flow chart depicting a method of practicing an embodiment of the present invention. At step 301, the system is in idle mode. Although not shown, the system can instead be in a heartbeat mode. At step 302, it is determined whether payload data is present. If payload data is present, then at step 303, a number of traffic channels are requested from a base station. Once the traffic channels are assigned, the payload data is transmitted over the requested channels at step 304. The channels are then released, and the system returns to idle mode. In one embodiment of the present invention, a release message can be sent after the payload data is transmitted.

The constructed traffic channels can be one or many radio frequency channels, and the payload-data transmission can be code division multiple access (CDMA) transmission Note that the flow charts in the present document are numbered, and the claim steps are numbered or lettered, solely for the reader's convenience. The embodiment and the claims are not intended to imply an order to the steps; the steps can be performed in any order practicable.

FIG. 4 is a block diagram of an apparatus according to an embodiment of the present invention. FIG. 4 includes processor 401 and memory 402, with memory 402 storing instructions adapted to be executed on processor 401 to run any method embodiment of the present invention. For example, memory 402 can store instructions adapted to be executed on processor 401 to determine whether payload data is present, determine the size of the payload data, request a number of traffic channels, and then transmit the payload data over the traffic channels.

For the purposes of this application, memory includes any medium capable of storing instructions adapted to be executed by a processor. Some examples of such media include, but are not limited to, RAM, ROM, floppy disks, CDROM, magnetic tape, hard drives, optical storage units, and any other device that can store digital information. In one embodiment, the instructions are stored on the medium in a compressed and/or encrypted format. As used herein, the phrase "adapted to be executed by a processor" is meant to encompass instructions stored in a compressed and/or encrypted format, as well as instructions that have to be compiled or installed by an installer before being executed by the processor.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A wireless code division multiple access (CDMA) device comprising:
   a processing device, while in an idle mode, configured, on a condition that payload data associated with a channel is present, to determine a size of the payload data associated with the channel;
   wherein the processing device is further configured, on the condition that the payload data associated with the channel is present, to transmit, in an active mode, information to a base station to request traffic channels from the base station;
   wherein the processing device is further configured to receive a grant in response to the transmitted information;
   wherein the processing device is further configured in response to the grant to transmit the payload data over at least one CDMA channel;
   the processing device further configured to transmit a release message after the payload data is transmitted and to return the CDMA device to the idle mode, wherein a mode for device operation over in a forward direction is independent of a mode for device operation in a reverse direction.

2. The wireless CDMA device of claim 1 wherein a number of CDMA channels that the payload data is transmitted over is derived from at least the grant.

3. The wireless CDMA device of claim 1 wherein the payload data is transmitted over a plurality of CDMA channels and a portion of the payload data is transmitted over each channel.

4. The wireless CDMA device of claim 3 wherein a number of the plurality of CDMA channels that the payload data is transmitted over is derived from at least the grant.

5. The wireless CDMA device of claim 1 wherein the processing device is further configured to transition from an idle to an active mode on a condition that the payload data is received.

6. The wireless CDMA device of claim 1 wherein on a condition that the processing device has no payload data to transmit, the processing device is further configured to transmit only a CDMA control channel to the base station.

7. The wireless CDMA device of claim 6 wherein the CDMA control channel transmission is used for uplink timing synchronization.

8. The wireless CDMA device of claim 7 wherein the CDMA control channel transmission has a lower bandwidth than the CDMA control channel transmission when transmitted with a CDMA channel carrying payload data.

9. A method implemented in a wireless code division multiple access (CDMA) device, the method comprising:
   on a condition that payload data associated with a channel is present when in an idle mode, determining a size of the payload data associated with the channel;
   on the condition that the payload data associated with the channel is present, transmitting information to a base station to request traffic channels from the base station;
   receiving a grant in response to the transmitted information;
   wherein the processing device is further configured in response to the grant transmitting the payload data, in an active mode, over at least one CDMA channel in response to the grant, the CDMA device further configured to transmit a release message after the payload data is transmitted and to return the CDMA device to the idle mode, wherein a mode for device operation over in a forward direction is independent of a mode for device operation in a reverse direction.

10. The method of claim 9 wherein a number of CDMA channels that the payload data is transmitted over is derived from at least the grant.

11. The method of claim 9 wherein the payload data is transmitted over a plurality of CDMA channels and a portion of the payload data is transmitted over each channel.

12. The method of claim 11 wherein a number of the plurality of CDMA channels that the payload data is transmitted over is derived from at least the grant.

13. The method of claim 9 further comprising transitioning from an idle to an active mode on a condition that the payload data is received.

14. The method of claim 9 transmitting only a CDMA control channel to the base station on a condition that a processing device has no payload data to transmit.

15. The method of claim 14 wherein the CDMA control channel transmission is used for uplink timing synchronization.

16. The method of claim 15 wherein the CDMA control channel transmission has a lower bandwidth than the CDMA control channel transmission when transmitted with a CDMA channel carrying payload data.

* * * * *